United States Patent [19]
Okuno et al.

[11] Patent Number: 5,212,906
[45] Date of Patent: May 25, 1993

[54] LIQUID CULTURE APPARATUS

[76] Inventors: Noboru Okuno, 2-10-1 Fujimino, Hiratsuka-shi, Kanagawa-ken; Masahiro Sei, 58-2, Shimo-Ochiai, Isehara-shi, Kanagawa-ken; Hiroshi Abe, 4-34-5, Soshi-gaya, Setagaya-ku, Tokyo, all of Japan

[21] Appl. No.: 548,885

[22] PCT Filed: Feb. 10, 1988

[86] PCT No.: PCT/JP88/00138
§ 371 Date: Oct. 1, 1990
§ 102(e) Date: Oct. 1, 1990

[87] PCT Pub. No.: JP88/00138
PCT Pub. Date: Feb. 10, 1988

[51] Int. Cl.⁵ .............................................. A01G 31/00
[52] U.S. Cl. ............................................ 47/62; 47/59
[58] Field of Search ........................... 47/62, 59, 79, 14

[56] References Cited

U.S. PATENT DOCUMENTS 4,068,405 1/1978 Campbell et al. .

FOREIGN PATENT DOCUMENTS

| | | |
|---|---|---|
| 1512606 | 8/1976 | Austria . |
| 0201426 | 5/1986 | European Pat. Off. . |
| 0300536 | 7/1988 | European Pat. Off. . |
| 59-159246 | 10/1984 | Japan . |
| 60-156329 | 8/1985 | Japan . |
| 61-108315 | 5/1986 | Japan . |
| 62-242522 | 10/1986 | Japan . |
| 62-4955 | 1/1987 | Japan . |
| WO 83/01365 | 10/1982 | PCT Int'l Appl. . |
| 2054525 | 6/1980 | United Kingdom . |
| 2150405 | 12/1984 | United Kingdom . |
| 2192875 | 6/1987 | United Kingdom . |

*Primary Examiner*—Richard E. Chilcot, Jr.
*Assistant Examiner*—Joanne C. Downs
*Attorney, Agent, or Firm*—Ronald Craig Fish

[57] ABSTRACT

An apparatus for effecting the liquid culture of a plant body (T) implanted on a nutrient broth medium with the nutrient broth medium permeating a nutrient broth support (10) formed of a porous or fibrous material. At this juncture, the nutrient broth support (10) is accommodated in a nursery chamber (20) maintained in an aseptic state, and is placed on a liquid impregnation/drainage controller (60) having the function of transmitting and receiving (replacing) the liquid, inside the nursery chamber (20) The liquid impregnation/drainage controller (60) causes the liquid (mainly a nutrient broth) supplied from an external nutrient broth supplying device (50) to be supported (impregnate)the nutrient broth support (10) placed. At the same time, the liquid impregnation/drainage controller (60) discharges the liquid supported by the nutrient broth support (10) by making use of, for instance, the capillary phenomenon or the like in correspondence with the state of its draining portion (62). The nutrient broth supplied to the plant body (T) is automatically replaced via the nutrient broth support (10) by making use of the liquid replacing function of the liquid impregnation/drainage controller (60).

18 Claims, 11 Drawing Sheets

LIQUID CULTURE APPARATUS

TECHNICAL FIELD

The present invention relates to the breeding of plants and production of seedlings by means of plant tissue culture as well as acclimatization of grown seedlings, and more particularly to a liquid culture apparatus for breeding, production of seedlings, and the like by means of liquid culture without using an agar medium.

BACKGROUND ART

The tissue culture of plants is utilized for numerous purposes such as the large-scale proliferation of virus-free strains and elite plants and production of new plant varieties. In conventional tissue culture, a mainstream method has been one using the so-called agar medium in which a prescribed medium solution having a fixed composition is formed by agar as its medium.

FIG. 11 diagrammatically shows tissue culture using the agar medium containing nutrients. That is, in such tissue culture, a plant tissue (see FIG. 11(a)) removed by being cut from a plant is first placed in the agar medium in a container and is proliferated therein (see FIG. 11(b)). The germinated tissue is further divided by being cut (see FIG. 11(c)), and is then transplanted in a rooting agar medium in another container and undergoes rooting therein (see FIG. 11(d)). The plant which has thus rooted is removed from the contained, and the agar attached to its root is washed away (see FIG. 11(e)). Subsequently, the plant is moved into an acclimatizer (see FIG. 11(f)). In this acclimatizer, re. rooting is promoted in a highly humid environment with light shielded. Finally, a seedling thus grown is removed from the acclimatizer and is acclimatized to the external environment (see FIG. 11(g)).

Thus, in the conventional tissue culture, in each stage of proliferation, germination, and rooting, separate agar media containing most suitable components are used. Accordingly, it is true that suitable nutrition corresponding to its growth stage is constantly supplied to the plant, and that favorable results are attained. On the other hand, for that purpose, the aforementioned transplanting operations are required in each stage of culture, and in cases where the nutrition in the agar are lacking, the plant needs to be transplanted in new agar, thereby involving substantial manpower and cost. Incidentally, such a transplanting operation is conducted in an aseptic state.

In addition, in the above described conventional plant culture, at the time when the young seedling which has rooted is subjected to acclimatization to the outside, it is necessary to transplant it to an implantation medium such as vermiculite or the like. At that juncture, since sugar is contained in the aforementioned agar medium, the portion of its root is usually washed with water, as described above, for the purpose of preventing the occurrence of mold. On the other hand, however, there arise problems in that the root is liable to become damaged and that its growth is delayed. It goes without saying that the trouble and cost required for washing and transplantation cannot be ignored.

Furthermore, in the above-described conventional method, the root which has developed in the medium is liable to lapse into a state of oxygen shortage, and therefore there are many cases where the plant fails to elongate sufficiently and become teratomatic. Moreover, with this conventional method, the replacement, replenishment, and discharge of the medium during culture are impossible, and therefore it is impossible to constantly optimize the gas and components of the medium.

The present invention has been devised in the light of the above-described circumstances in tissue culture, and the object of the present invention is to provide a liquid culture apparatus which is capable of constantly maintaining the above-described plant tissue (hereinafter referred to as the "plant body" as a generic term for the tissue as well as an adventitious embryo of a shoot primordium into which the tissue has grown) in an optimum environment without requiring any operations such as transplantation in the course of culture including implantation, germination, and rooting, as well as acclimatization to the outside, and which in the end is capable of attaining high-speed, large-scale production at low cost on a stable basis.

DISCLOSURE OF THE INVENTION

In accordance with the present invention, on the premise of the fostering of seedlings by means of liquid culture, there is provided a liquid culture apparatus comprising: a nutrient broth support for implantation of a plant body therein and constituted by a porous or fibrous material capable of being impregnated with a nutrient broth; a nursery chamber for accommodating at least one nutrient broth support; first liquid controlling (liquid-supply controlling) means for transferring and supplying a liquid to the nursery chamber; second liquid controlling (impregnation and drainage controlling) means which is constituted by a water absorbent material having a smaller porosity than the nutrient broth support and is disposed at a bottom of the nursery chamber as a member for placing the nutrient broth support thereon, the second liquid controlling means being connected to the first liquid controlling means and arranged such that when the liquid is supplied by means of the first liquid controlling means, the second liquid controlling means causes the nutrient broth support to be impregnated with the liquid supplied, and when the supply of the liquid is being suspended, the second liquid controlling means drains the liquid impregnating the nutrient broth support; and third liquid controlling (drainage controlling) means connected to the second liquid controlling means and adapted to drain the liquid circulated via the second liquid controlling means to outside the nursery chamber.

By virtue of this arrangement, if, for instance, a germination nutrient broth containing effective components for the germination of the plant body implanted in the nutrient broth support is transferred and supplied to the nursery chamber as the aforementioned liquid, this germination nutrient broth is supported by (impregnates) the nutrient broth support as a nutrient broth medium, thereby automatically allowing the plant body to be placed in a favorable environment for germination. In addition, if a rooting nutrient broth containing effective components for the rooting of the plant body is transferred and supplied to the nursery chamber, this rooting nutrient broth is supported by (impregnates) the nutrient broth support as the nutrient broth medium, thereby automatically allowing the germinated plant body to be placed in a favorable environment for rooting. Furthermore, if a cultivation nutrient broth containing effective components for the fostering of the plant body and not containing sugar is transferred and supplied to the nursery chamber, this cultivation nutrient broth is supported by (impregnates) the nutrient broth support as the nutrient broth medium, thereby automatically allowing the rooted plant body to be placed in a favorable environment for the production of the seedling and acclimatization to the outside.

Accordingly, by consecutively and selectively transferring and supplying the respective nutrient broths in correspondence with the growth stage of the plant body, it becomes possible to realize breeding, fostering of seedlings, acclimatization of grown seedlings, and the like constantly in an optimum environment for the plants without requiring any troublesome operations mentioned above such as transplanting.

Also, at the time of replacing the nutrient broth to be supported by the nutrient broth support, if pure water is used as the aforementioned liquid to be transferred and supplied, it becomes possible to automatically wash the nutrient broth support.

In particular, the nutrient broth support and the second liquid controlling means mentioned above are provided with structures suitable for the transmission and reception of such a liquid (automatic impregnation and draining thereof in correspondence with the liquid level).

BEST MODE FOR CARRYING OUT THE INVENTION

Figure 1:
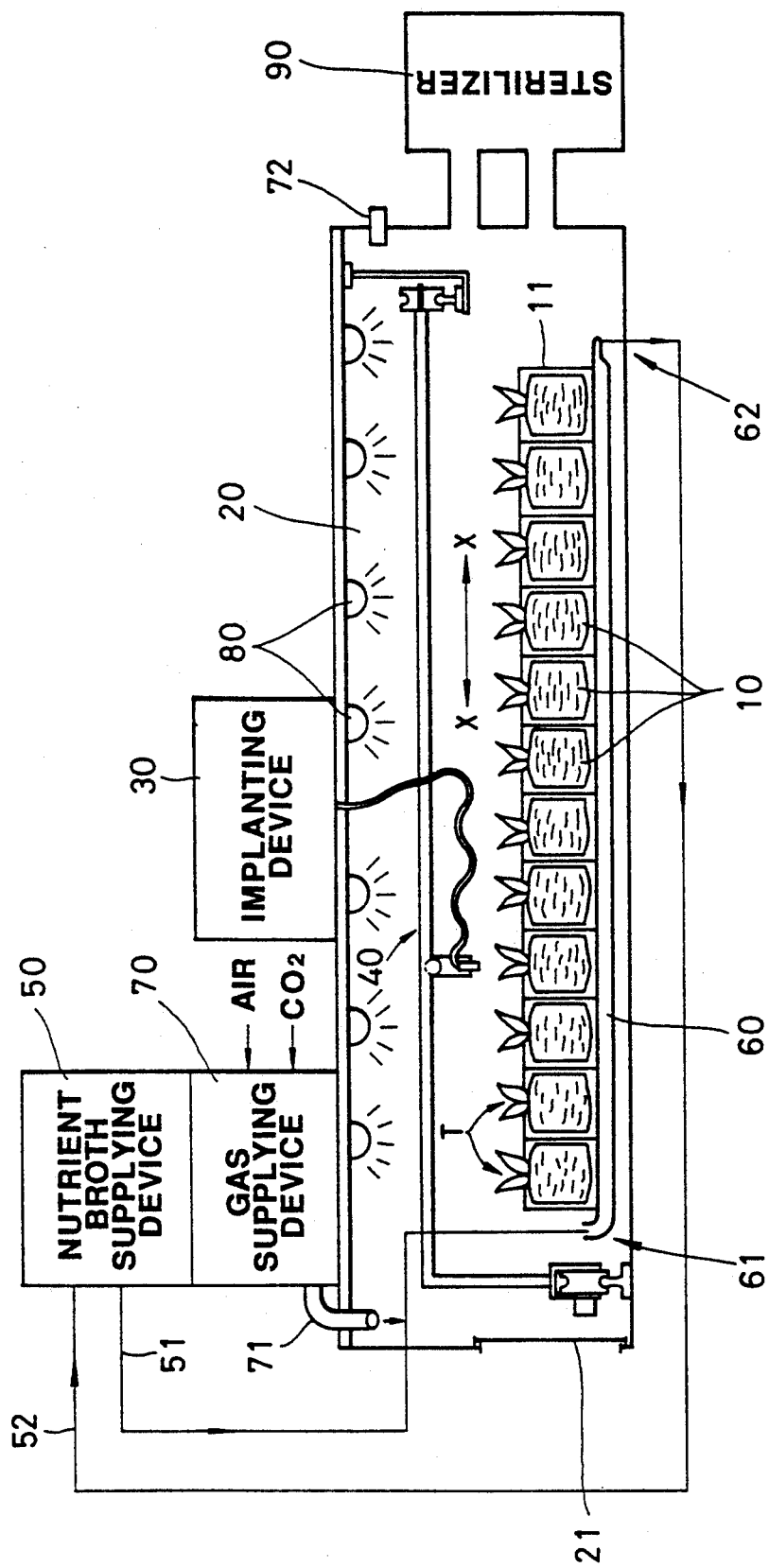
FIG. 1 is a schematic diagram illustrating an overall arrangement of a first embodiment of a liquid culture apparatus in accordance with the present invention.

FIG. 1 illustrates an overall arrangement of a first embodiment of a liquid culture apparatus in accordance with the present invention.

As shown in FIG. 1, the apparatus of this embodiment comprises the following components: a plurality of nutrient broth supports 10 which are formed of a porous or fibrous material with excellent water retentivity and air permeability, and in which plant bodies T subject to culture are implanted; a nursery chamber 20 in which the nutrient broth supports 10 are accommodated via a carrying in-and-out port 21 which can be hermetically closed; an implanting device 30 and an implanting mechanism 40 for implanting the plant bodies T subject to culture on the respective nutrient broth supports 10 accommodated and arranged in this nursery chamber 20; a nutrient broth supplying device 50 which incorporates a tank for storing in an aseptic state nutrient broths such as a germination nutrient broth containing effective components for the germination of the plant bodies T, a rooting nutrient broth containing effective components for the rooting of the plant bodies T, and a cultivation nutrient broth (not containing sugar) containing effective components for growing the plant bodies T, and pure water or the like for washing which will be described later, the nutrient broth supplying device 50 being adapted to selectively deliver these nutrient broths or pure water by means of a pump or the like; a liquid transfer device 51 constituted by a pipe product or the like and adapted to transfer and supply to the nursery chamber 20 the nutrient broths or pure water thus delivered; a liquid impregnation/drainage controller 60 which is disposed as a member for placing thereon the nutrient broth supports 10 in the nursery chamber 20 as shown in the drawing, a liquid supplying portion 61 at one end thereof being connected to the transfer device 51; and the liquid impregnation/drainage controller 60 being arranged such that when the nutrient broth or pure water is supplied by means of the transfer device 51, the liquid impregnation/drainage controller 60 causes the nutrient broth support to be impregnated with the nutrient broth or pure water supplied, and when the supply of the nutrient broth or pure water is being suspended, the liquid impregnation/drainage controller 60 drains the liquid impregnating the nutrient broth supports 10; a draining portion 62 disposed at the other end of the liquid impregnation/drainage controller 60 and adapted to drain the nutrient broths or pure water thus transmitted or received, to outside the nursery chamber 20; a circulator 52 for causing the drained liquid to return to the tank disposed in the nutrient broth supplying device 50; a gas supplying device 70 which incorporates a gas mixer for mixing the air and carbon dioxide ($CO_2$) at a predetermined ratio (e.g., the air includes not less than 250 ppm of $CO_2$) and which is adapted to deliver the gas mixture via a bacteria-proof filter or the like and after adjusting the temperature and humidity thereof to predetermined levels; a gas transfer device 71 constituted by a pipe product or the like and adapted to transfer and supply the delivered gas into the nursery chamber 20; a gas exhausting device 72 adapted to exhaust in an aseptic state the gas supplied into the nursery chamber 20 to outside the nursery chamber 20, as required, so as to maintain the interior of the nursery chamber 20 in the environment of a fresh gas; an illuminator 80 having a known light-adjusting device and adapted to supply appropriate light into the nursery chamber 20; and a sterilizer 90 for effecting sterilization by heating the interior of the nursery chamber 20 or using a bactericidal gas.

Here, as the aforementioned nutrient broth supports 10, it is possible to use polyester wool, ceramic wool, rock wool, peat moss, vermiculite, glass wool, cellulose, or the like, and these are accommodated, as required, in appropriate containers 11 which are bottomless or whose bottoms are constituted by a wire net or the like, and are used as the nutrient broth supports 10. In addition, these nutrient broth supports 10 are accommodated and arranged two-dimensionally in the nursery chamber 20 (to be precise, on the liquid impregnation/draining controller 60 in its interior) in the manner such as the one shown in FIG. 2.

Figure 3:
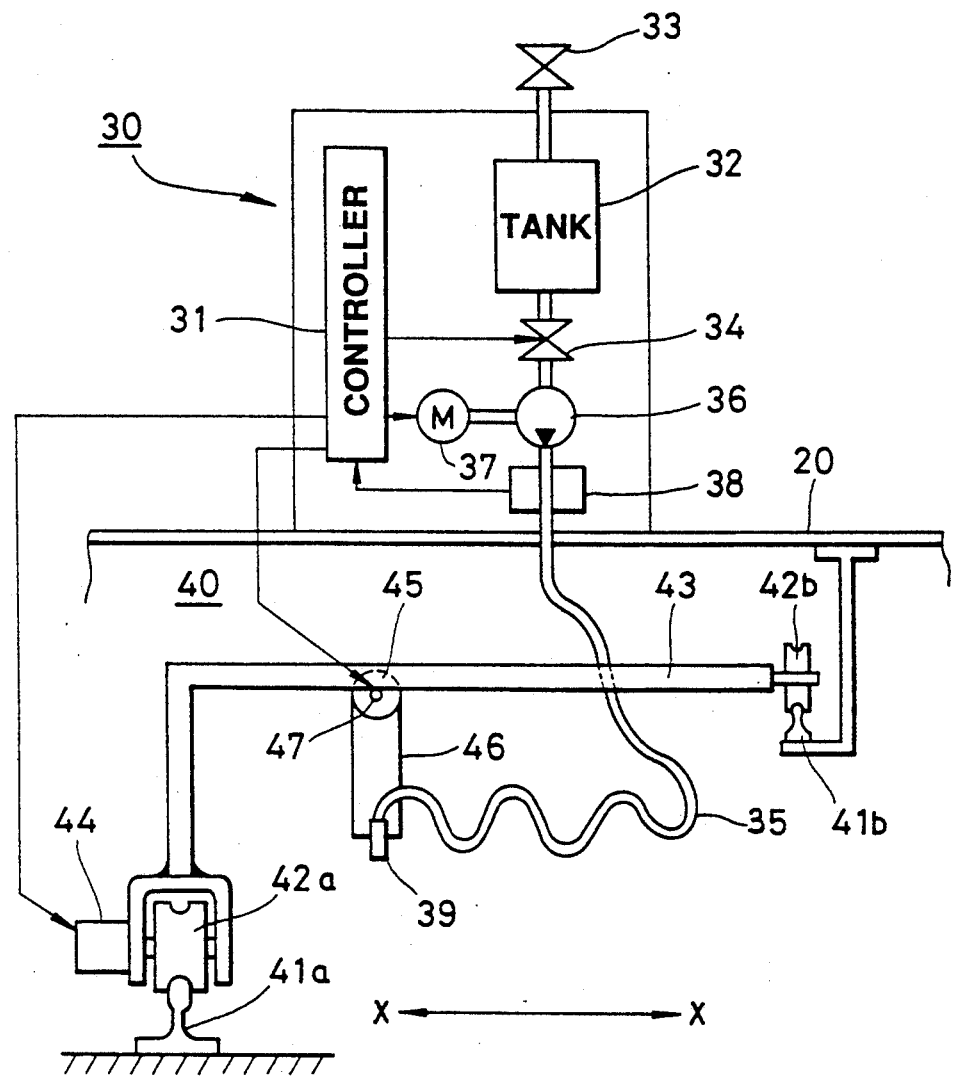
FIG. 3 is a block diagram illustrating an example of the arrangement of an implanting device of the apparatus of the embodiment shown in FIG. 1.

In addition, the implanting device 30 and the implanting mechanism 40 mentioned above are arranged in the manner such as the one shown in FIG. 3.

In FIG. 3, reference numeral 31 denotes a controller for effecting general control of the operation of the implanting device 30 and the implanting mechanism 40; 32, a tank in which the plant bodies T (here, their seeds) are stored; 33, a first valve used for loading the plant bodies T in this tank and also having the function of maintaining the interior of the tank 32 in an aseptic state; 34, a second valve which opens and closes on the basis of control by the controller 31; 35, a flexible hose; 36, a pump for transferring to the hose 35 the plant bodies T sent from the tank 32 via the second valve 34; 37, a first motor for actuating the pump 36 on the basis of control by the controller 31; 38, a tissue sensor for detecting the sending of the plant bodies T to the hose 35 and outputting a detection signal to the controller 31 to that effect; and 39, a nozzle fixed to the tip of the hose 35. In addition, numerals 41a and 41b denote first rails respectively disposed in the direction of Y—Y in the nursery chamber 20 (in a direction perpendicular to the plane of the drawing) in the manner shown in FIGS. 1 and 3, and 42a and 42b denote first rollers for moving on the first rails 41a and 41b in the direction of Y—Y, respectively. Numeral 43 denotes a second rail disposed in the direction of X—X in the nursery chamber 20 by being supported between the rollers 42a and 42b in the illustrated manner; 44, a second motor for rotatively driving the roller 41a on the basis of control by the controller 31 so as to move the second rail 43 integrally in the direction of Y—Y; 45, a second roller for moving in the direction of X—X on the second rail 43; 46 an arm affixed to the second roller 45 and adapted to support the nozzle 39; and 47, a third motor for rotatively driving the roller 45 on the basis of control by the controller 31 so as to move the arm 46, i.e., the nozzle 39 supported thereby, in the direction of X—X.

Figure 2:
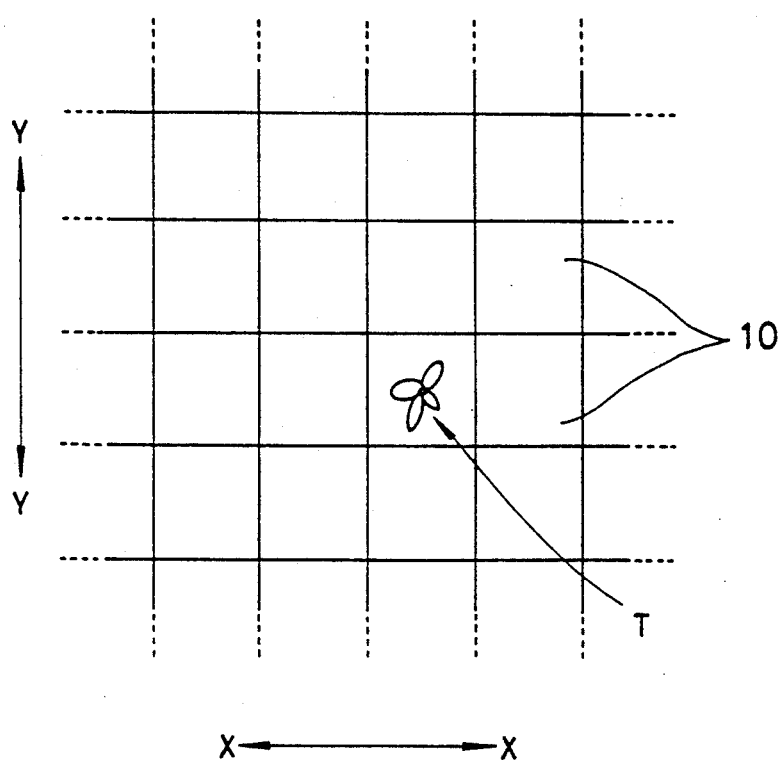
FIG. 2 is a top plan view schematically illustrating the mode in which nutrient broth supports are stored in a nursery chamber in the apparatus of the embodiment.

That is, of the implanting device 30 and the implanting mechanism 40, the implanting device 30 on the one hand is arranged such that, on the basis of detecting of the sending of the plant bodies T (seeds) by the tissue sensor 38 on each such occasion, the controller 31 actuates the pump 36, while controlling the opening and closing of the second valve 34, and in synchronism therewith as required, whereby the plant bodies T (seeds) stored in the tank 32 are discharged positively one by one via the hose 35 and its nozzle 39. The implanting mechanism 40, on the other hand, is arranged such that, the controller 31 controls the driving of the second and third motors 44 and 47 in a predetermined manner in synchronism with the discharging of the plant bodies T, whereby the two-dimensional coordinate position of the nozzle 39 in the directions of Y—Y and X—X is moved consecutively in correspondence with the arrangement of the nutrient broth supports 10, as shown in FIG. 2. In other words, the implanting device 30 and the implanting mechanism 40 thus arranged make it possible to effect the consecutive automatic implanting of the plant bodies T one by one on the respective nutrient broth supports 10 in correspondence with the two-dimensional scanning of the nozzle 39 over the nutrient broth supports 10 with the Y—Y direction set as the main scanning direction (or the sub scanning direction) and the X—X direction set as the sub scanning direction (or the main scanning direction).

In addition, with the apparatus of this embodiment shown in FIG. 1, the liquid impregnation/drainage controller 60 has its upper surface formed of a material, such as cotton, having a smaller porosity than that of the nutrient broth supports 10 so that the transmission and reception (impregnation and drainage) of the aforementioned liquid will be effected favorably between the same and all the nutrient broth supports 10 while the liquid impregnation/drainage controller 60 functions as a member for placing the nutrient broth supports 10 thereon. In addition, the liquid impregnation/drainage controller 60 functions to support the liquid (nutrient broth or pure water) supplied thereto to be supported in (impregnates) the nutrient broth supports 10 in correspondence with a rise in the level of that liquid, and also functions to prompt the draining of the liquid supported in (impregnating) the respective nutrient broth supports 10 in correspondence with the suspension of the supply of the liquid or a drop in the liquid level. That is, control of the water content in the nutrient broth supports 10 is realized by virtue of this impregnating/draining action of the impregnating/draining control device 60 capillarily connected to the nutrient broth supports 10. The liquid drained from the nutrient broth supports 10 and returned to this impregnating/draining control device 60 is also drained to outside the nursery chamber 20 via the draining portion 62 disposed at the tip of the impregnation/drainage controller 60.

The processing procedures of liquid culture conducted by using the embodiment of the first embodiment will be listed below.

(1) First, the carrying in-and-out port 21 is opened, and the nutrient broth supports 10 (where required, including the containers 11) are accommodated and arranged on the liquid impregnation/drainage controller 60 inside the nursery chamber 20.

(2) Then, the carrying in-and-out port 21 is hermetically closed, and the entire interior of the nursery chamber 20 is sterilized by means of the sterilizer 90.

(3) After sterilization, the internal environment of the nursery chamber 20 is returned to the normal state, and the plant bodies T (seeds) are implanted with respect to all the accommodated nutrient broth supports 10 by means of the implanting device 30 and the implanting mechanism 40. At this juncture, the aseptic state of the plant bodies T (seeds) is maintained by virtue of the above-described arrangement of the implanting device 30.

(4) Upon completion of implantation, the germination nutrient broth is supplied to the nursery chamber 20 by means of the nutrient broth supplying device 50 and the transfer device 51. As a result, the germination nutrient broth is supported by (permeates) the respective nutrient broth supports 10 as a nutrient broth medium through the aforementioned operation of the liquid impregnation/drainage controller 60. In addition, in conjunction with the supply of the nutrient broth, the supply of gas with predetermined components and at predetermined temperature and humidity is effected by means of the gas supplying device 70 and the transfer device 71, and the supply of predetermined light is effected by means of the illuminator 80. By placing the nursery chamber 20 in such an environment, the implanted plant bodies T (seeds) undergo germination with the lapse of time.

(5) When desired germination is thus obtained, the supply of the germination nutrient broth by means of the nutrient broth supplying device 50 and the transfer device 51 is stopped and, instead of this germination nutrient broth, the supply of pure water by means of the nutrient broth supplying device 50 and the transfer device 51 is effected for an appropriate time. As a result, the nutrient broth supports 10 are washed through the aforementioned operation of the liquid impregnation/drainage controller 60.

(6) After washing, the aforementioned rooting nutrient broth is then supplied by means of the nutrient broth supplying device 50 and the transfer device 51. As a result, the rooting nutrient broth is newly supported on (impregnates) the nutrient broth supports 10 as a nutrient broth medium. The plant bodies T placed in this environment undergo rooting with the lapse of time, as described above. At this juncture as well, the aforementioned gas and light are adjusted so as to be suitable for the environment for such rooting.

(7) When desired rooting is thus obtained, the washing of the nutrient broth supports 10 is effected in a manner similar to that of processing in step (5) above. In particular, washing is important in removing nutrients such as sugar contained in the germination nutrient broth.

(8) After washing, the aforementioned cultivation nutrient broth is supplied by means of the nutrient broth supplying device 50 and the transfer device 51. As a result, the cultivation nutrient broth is newly supported on (impregnates) the respective nutrient broth supports 10 as a nutrient broth medium in the same way as before. In addition, in this process, an attempt is also made to reduce the humidity of the interior of the nursery chamber 20 in correspondence with the growth of the seedlings with a view to acclimatization to the external environment.

(9) By timing a stage at which the plant bodies T have developed into grown seedlings, they are removed from the carrying in-and-out port 21.

The processing of steps (1) to (9) above is repeatedly carried out.

Thus, in accordance with the apparatus of this embodiment, culture such as the implantation, germination, and rooting of the plant bodies as well as their acclimatization to the outside can naturally be effected in a state in which the material (nutrient broth supports 10) carried in from the outside is set in a sterile, aseptic state, and the components of the nutrient broths, gas components, light, temperature, and humidity can be controlled to optimum levels in the respective stages of culture. In addition, by continuously employing the identical nutrient broth supports in the respective stages of culture, the transplanting operation and the like involving manpower are not required at all. Accordingly, the root which has developed is not subjected to damage.

The washing processing in the aforementioned step (5) is not necessarily required in that stage, but if it is implemented, a situation in which the germination nutrient broth and the rooting nutrient broth are mixed in the nutrient broth supports 10 is obviated favorably in the initial stage of the supply of the rooting nutrient broth (processing in the step (6) above).

Figure 4:
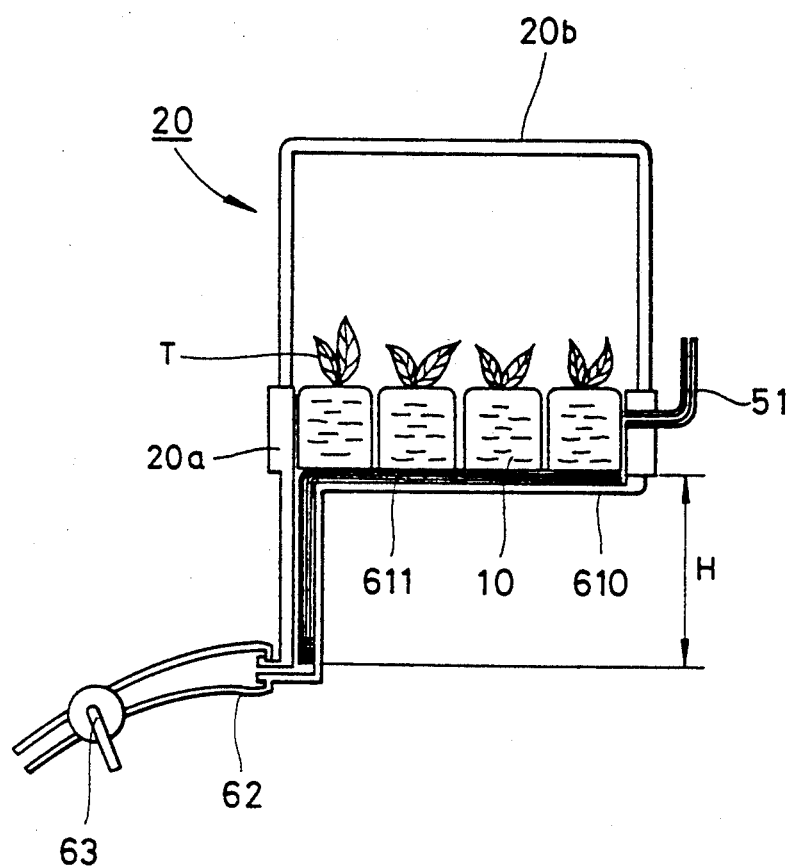
FIG. 4 is a schematic diagram illustrating the arrangement of essential portions of a second embodiment of the liquid culture apparatus in accordance with the present invention.

FIG. 4 illustrates a structure of essential portions of an apparatus in accordance with a second embodiment of the present invention. This second embodiment is an improvement and an embodiment of the structure of the liquid impregnation/drainage controller 60 in the apparatus of the first embodiment described above. The portion shown in FIG. 4 corresponds to a partial cross section, taken in the direction of X—X, of the nursery chamber shown in FIG. 1.

In FIG. 4, reference numeral 20a denotes a light-transmitting cover constituting the nursery chamber 20, and functions in such a manner as to promote the growth of the plant by allowing the light to be transmitted therethrough. It goes without saying that the illuminator 80 mentioned above may be adopted instead of it. In addition, reference numeral 20b denotes an overall nursery chamber, in which a liquid impregnation/drainage controller 610 having capillary members 611 is disposed, and the nutrient broth supports 10 are disposed thereon. The capillary members 611 are constituted by a water absorbent material such as nonwoven fabrics. In addition, the plant bodies T are planted in the nutrient broth supports 10. Although the plant bodies T are illustrated as being seedlings in the drawing, they may be those either at the time of the above-described culture or at the time of acclimatization to the outside. Reference numeral 51 denotes the aforementioned liquid transfer device which is adapted to aseptically supply to the liquid impregnation/drainage controller 610 the nutrient broth and the like supplied from the unillustrated nutrient broth supplying device. In addition, reference numeral 62 denotes the aforementioned draining portion, and 63 denotes a valve provided in the draining portion 62.

In accordance with this structure, the nutrient broth supported by (impregnating) the nutrient broth supports 10 as described above is discharged through the capillary members 611 of the liquid impregnation/drainage controller 610 and the draining portion 62 when the valve 63 is opened. At this time, when the height indicated by H in the drawing is higher than the peculiar height of rise in the capillary tubes, the liquid contained in the nutrient broth supports 10 is discharged rapidly through the capillary members 611. That is, the aforementioned liquid replacing action of the liquid impregnation/drainage controller is attained speedily.

Incidentally, as for the nutrient broth supports 10, a material having a relatively large porosity, such as polyester wool, ceramic wool, cellulose, or the like, is selected, while the capillary members 611 constituted by nonwoven fabrics or the like have a small porosity. Such a difference in porosity between the nutrient broth supports 10 and the capillary members 611 induces the aforementioned capillary phenomenon, and moves the liquid contained in the nutrient broth supports 10 to the capillary members 611. In this embodiment, such a phenomenon is induced only at the time of drainage when the aforementioned valve 63 is opened, and in a state in which the valve 63 is closed and the impregnation/drainage controller and the nutrient broth supports 10 are filled with the liquid, the aforementioned capillary phenomenon based on the difference in porosity between the nutrient broth supports 10 and the capillary members 611 does not take place.

In addition, in accordance with the aforementioned liquid impregnating/draining action of the capillary members 611 capillarily connected to the nutrient broth supports 10, it becomes possible to more effectively realize not only the aforementioned washing effect but also control of the water content in the nutrient broth supports 10. For instance, in cases where the roots of plants have grown in a state of an excess water content, degeneration of roots due to the excess water content, which is called culture roots, is liable to occur, so that it is necessary to increase the gaseous phase rate of the nutrient broth supports 10 and set their conditions as the same conditions of general soil. In accordance with such a structure of capillary connection between the nutrient broth supports 10 and the capillary members 611, control of the water content becomes possible in which the liquid is caused to be saturated in the nutrient broth supports 10 at the time of implantation, and their gaseous phase rate is increased while the water content is gradually decreased from the nutrient broth supports 10 in correspondence with the subsequent state of rooting, on the basis of control of the liquid supplied through the liquid transfer device 51 and control of the opening and closing of the valve 63. It should be noted that although dense fibers are suitable as the capillary members 611, it is possible to use ceramics.

In the second embodiment shown in FIG. 4, the liquid replacing function of the liquid impregnation/drainage controller is enhanced by capillary draining which makes use of gravity. The structure of further enhancing the liquid replacing function based on a similar principle is shown in FIG. 5 as a third embodiment.

Figure 5:
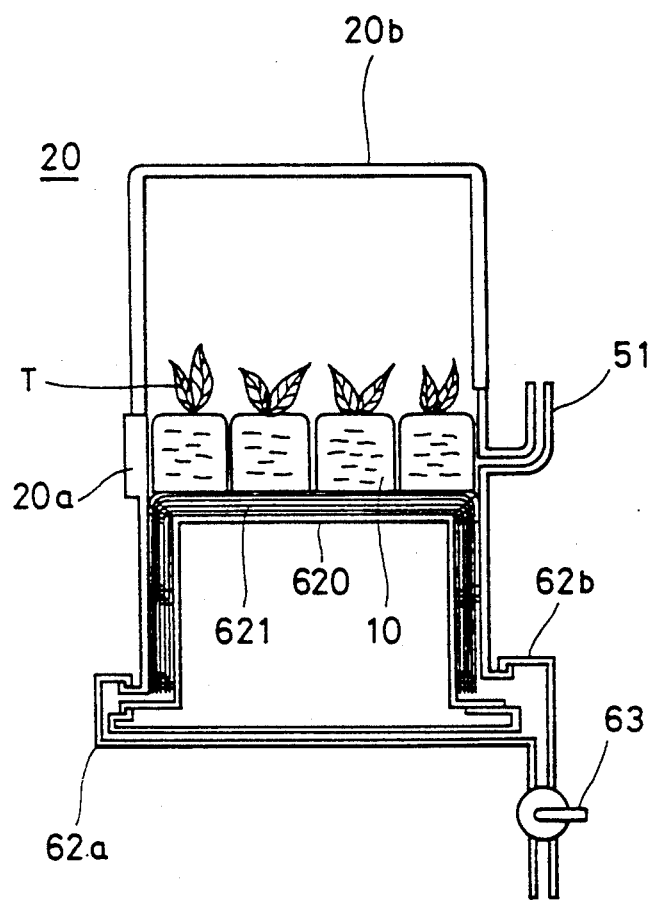
FIG. 5 is a schematic diagram illustrating the arrangement of essential portions of a third embodiment which is a modification of the second embodiment.

In the apparatus of the third embodiment shown in FIG. 5, the amount of liquid discharged per hour is increased in comparison with the apparatus of the second embodiment by providing draining portions 62a and 62b on opposite sides of the nursery chamber 20 (a main body 20a of the nursery chamber), respectively. In FIG. 5, reference numeral 620 denotes the liquid impregnation/drainage controller, while 621 denotes the capillary members provided therein.

In accordance with the capillary gravity draining systems shown as the second and third embodiments, even if there are some foams, the draining from the nutrient broth supports 10 is continued insofar as there is any slightest capillary communication. Accordingly, the amount of the liquid that finally remains in the nutrient broth supports 10 is extremely small. Moreover, it suffices if the nutrient broth supports 10 are merely placed on the capillary members 611 or 621, and no airtightness is required.

Figure 6:
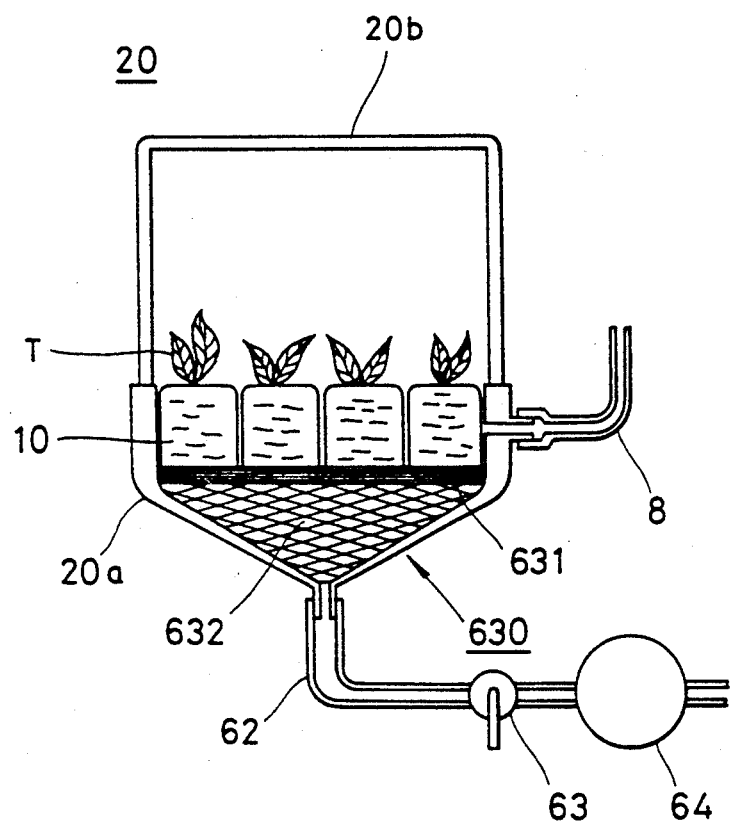
FIG. 6 is a schematic diagram illustrating the arrangement of essential portions of a fourth embodiment which is a further modification of the second or third embodiment.

FIG. 6 illustrates the structure in cases where draining is effected by using a suction system based on negative pressure.

In FIG. 6, reference numeral 630 denotes the liquid impregnation/drainage controller; 631, a support member for the nutrient broth supports 10 and constituted by a wire net or the like; 632, capillary members; and 64, a vacuum pump. Specifically, in this fourth embodiment, water which has permeated the capillary members 632 is sucked by the vacuum pump 64. In this case, however, when the water is sucked under negative pressure from the valve 63 side, the liquid can be drained when the capillary members 632 and the main body 20a are in close contact with each other. Should an air passage be formed therebetween even at one location, the suction effect is lost, and draining is not carried out. Accordingly, in this case, suction is effected at a speed below the speed of the capillary movement so that the liquid will be filled uniformly in the capillary members 632. This structure also makes it possible to enhance the liquid replacing function of the liquid impregnation/drainage controller 630.

In each of the second to fourth embodiments as well, optimization control with respect to the gas, temperature, humidity, light quantity inside the nursery chamber 20 as well as sterilization can be effected in the same way as the first embodiment shown in FIG. 1.

Figure 7:
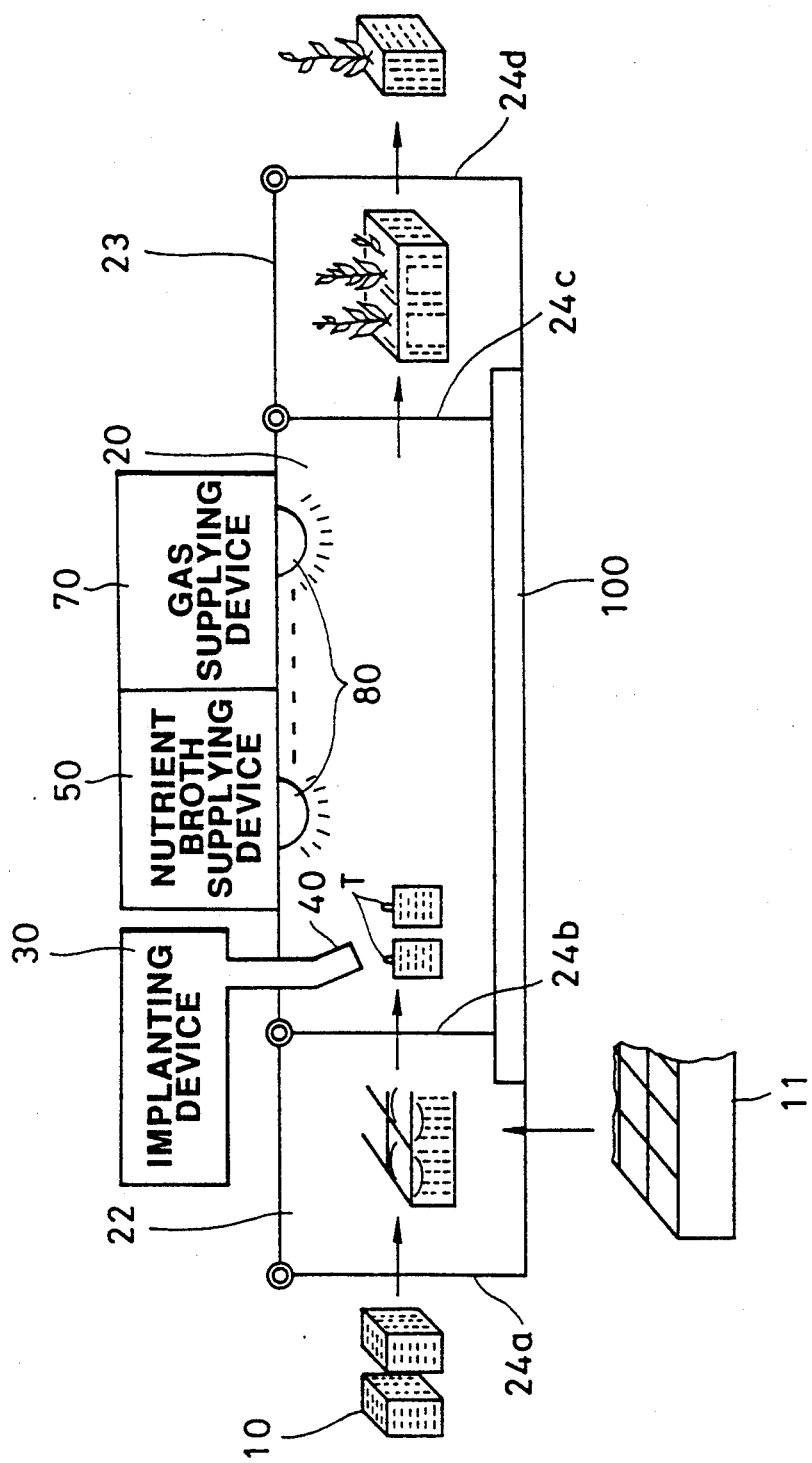
FIG. 7 is a schematic diagram illustrating the concept of the arrangement of a fifth embodiment of the liquid culture apparatus in accordance with the present invention.
Figure 8:
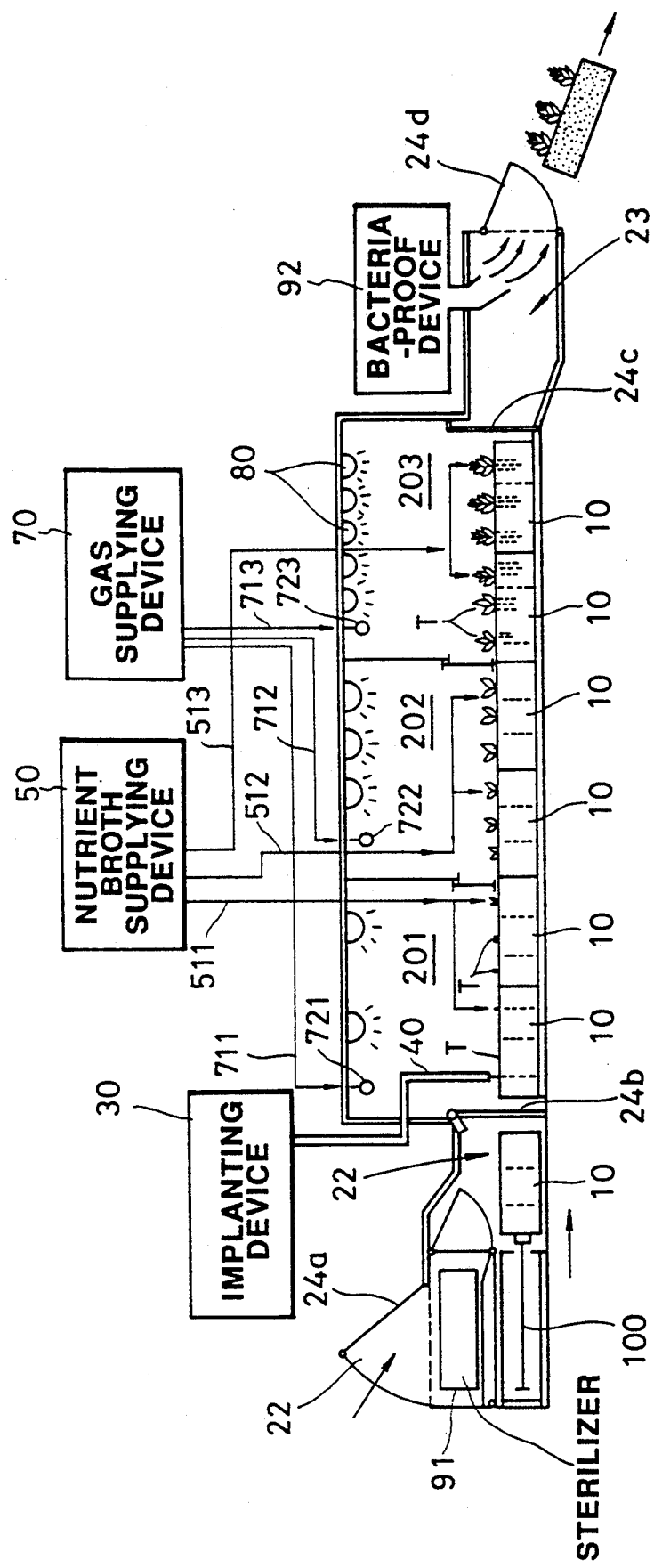
FIG. 8 is a schematic diagram illustrating an example of the arrangement of the fifth embodiment.

FIGS. 7 and 8 illustrate a fifth embodiment of the culture apparatus in accordance with the present invention. This fifth embodiment is arranged with a view to further promoting the automatic operation of the apparatus of the first embodiment shown in FIG. 1.

First, FIG. 7 illustrates the concept of the arrangement of the apparatus in accordance with this fifth embodiment.

That is, in this fifth embodiment, the arrangement provided is as follows: After a first door 24a is opened and the nutrient broth support 10 is carried into a sterilization entrance section 22, the nutrient broth support 10 is subjected to sterilization by steam heating or the like, and a nursery chamber opening/closing door 24b, which is a second door, is then opened before it can be carried into the nursery chamber 20 by means of a conveying device 100. At that juncture, the aforementioned support container 11 can also be carried in simultaneously together with the nutrient broth support 10, as required. Subsequently, the second door 24b is closed, the first door 24a is opened, an ensuing nutrient broth support 10 is carried into the entrance section 22. Thus, by alternately operating the first door 24a and the second door 24b, i.e., such that one door is opened when the other door is closed, the necessary material (nutrient broth support 10) can be aseptically carried into the nursery chamber 20. As the aforementioned conveying device 100, it is possible to employ a conveyor type, a robot arm type, a traveling crane type, or the like, as required.

Meanwhile, after the nutrient broth support 10 is sterilized or carried into the nursery chamber 20, the plant body T is aseptically implanted on the nutrient broth support 10 by the automatic implanting device 30 and the implanting mechanism 40 such as those shown in FIG. 3.

In the nursery chamber 20, the plant bodies T are cultured on the basis of a fixed system or a transfer system. At the time of culture, an optimum nutrient broth medium, gas (air with $CO^2$ added thereto), and light (artificial light or sun light) corresponding to each stage of culture are supplied by means of the nutrient broth supplying device 50, gas supplying device 70, and the illuminator 80, and the temperature and humidity are also optimally controlled in the same way as the first embodiment. With respect to the respective items of control, in the case of the fixed system, each item is controlled with the lapse of time at the same position utterly in the same way as the first embodiment. In the case of the transfer system, however, the nursery chamber 20 is divided into a plurality of chambers in advance in correspondence with the stages of culture, and as the position of the nutrient broth support 10 (plant body T) is moved forwardly (in the direction of the arrow) with progress in the stage of culture, control is effected in correspondence with a corresponding stage of culture for each divided chamber.

When the plant body T has thus become a seedling of an appropriate size, acclimatization control (lowering of humidity, an increase in illumination intensity, etc.) for acclimatizing the plant body T to the external environment is carried out as a final stage. At this juncture, an operation such as washing for removing nutrients contained in the medium by means of the liquid impregnation/drainage controller (not shown for the convenience' sake) or the like is conducted, as required.

Next, the nutrient broth support 10 (plant body T) is moved to a bacteria-proof exit section 23. This exit section 23 is provided with an exit opening/closing door 24c for the nursery chamber as well as an exit opening/closing door 24d for exit from the exit section. These opening/closing doors 24c and 24d and the conveying device 100 are interconnected with each other in the same way as the first and second doors 24a and 24b. Immediately after the plant body T which has become a grown seedling is placed in the exit section 23, the plant body T is carried out to the outside in a state in which the entrance of various bacteria into the nursery chamber 20 from the outside is prevented through a combination of a heating sterilizing device or a bacteria proof device or the like making use of an air flow as well as the doors 24c and 24d.

FIG. 8 illustrates an example of the arrangement of the above-described apparatus in accordance with the fifth embodiment, and in particular the case of the transfer type is illustrated here. In FIG. 8, elements that are identical with those shown in FIG. 1 or functionally correspond thereto are shown by being denoted by identical or corresponding reference numerals.

In the apparatus of this embodiment, the nutrient broth support 10 together with the container 11 accommodating the same is carried in through the carrying-in port 22 and is subjected to sterilization by heating by means of a heating sterilizing device 91. Then, the door 24b is opened by the conveying device 100 of a pusher type, and the nutrient broth support 10 is introduced into a first nursery chamber 201 by the conveying device 100. At that juncture, all the nutrient broth supports 10 situated in respective nursery chambers 201, 202 and 203 are moved simultaneously to enter the respective ensuing stage of culture.

The plant body T is implanted on the nutrient broth support 10 which has entered the first nursery chamber 201 by means of the automatic implanting device 30 and the implanting mechanism 40.

Here, a nutrient broth medium and a gas that are suitable for each stage of culture are supplied to the aforementioned nursery chambers 201, 202 and 203 by means of respective liquid transfer devices 511, 512 and 513 as well as gas transfer devices 711, 712 and 713, and a suitable amount of light is supplied to them by means of each illuminator 80. Although an illustration is omitted here, respective liquid impregnation/drainage controllers are connected to the liquid transfer devices 511, 512 and 513 so as to effect the transmission and reception (replacement) of the liquid with respect to the corresponding nutrient broth supports 10 in each nursery chamber in the above-described manner. As these liquid impregnation/drainage controllers, it is possible to employ those shown in the first to fourth embodiments.

The plant body T (nutrient broth support 10) for which the final acclimatization processing has been completed is taken out through the carrying-out port 24 as the plant body T (nutrient broth support 10) is pushed out, as described above. At that juncture, an arrangement is provided such that bacteria and the like will not enter the nursery chamber 20 (203) by means of a bacteria-proof air curtain device 92. Reference numeral 24c denotes the exit opening/closing door for the nursery chamber which is pushed open by means of the nutrient broth support 10 placed in the third nursery chamber 203 as it is pushed out, as described above.

It should be noted that, in addition to this transfer type, by using a fixed type (automated only with respect to the carrying in and out of the nutrient broth supports into the nursery chamber) using a traveling crane-type robot or the like, culture may be continued at the same position and various control elements may be controlled with the lapse of time in correspondence with the stage of culture that changes with time, as described before.

Figure 9:
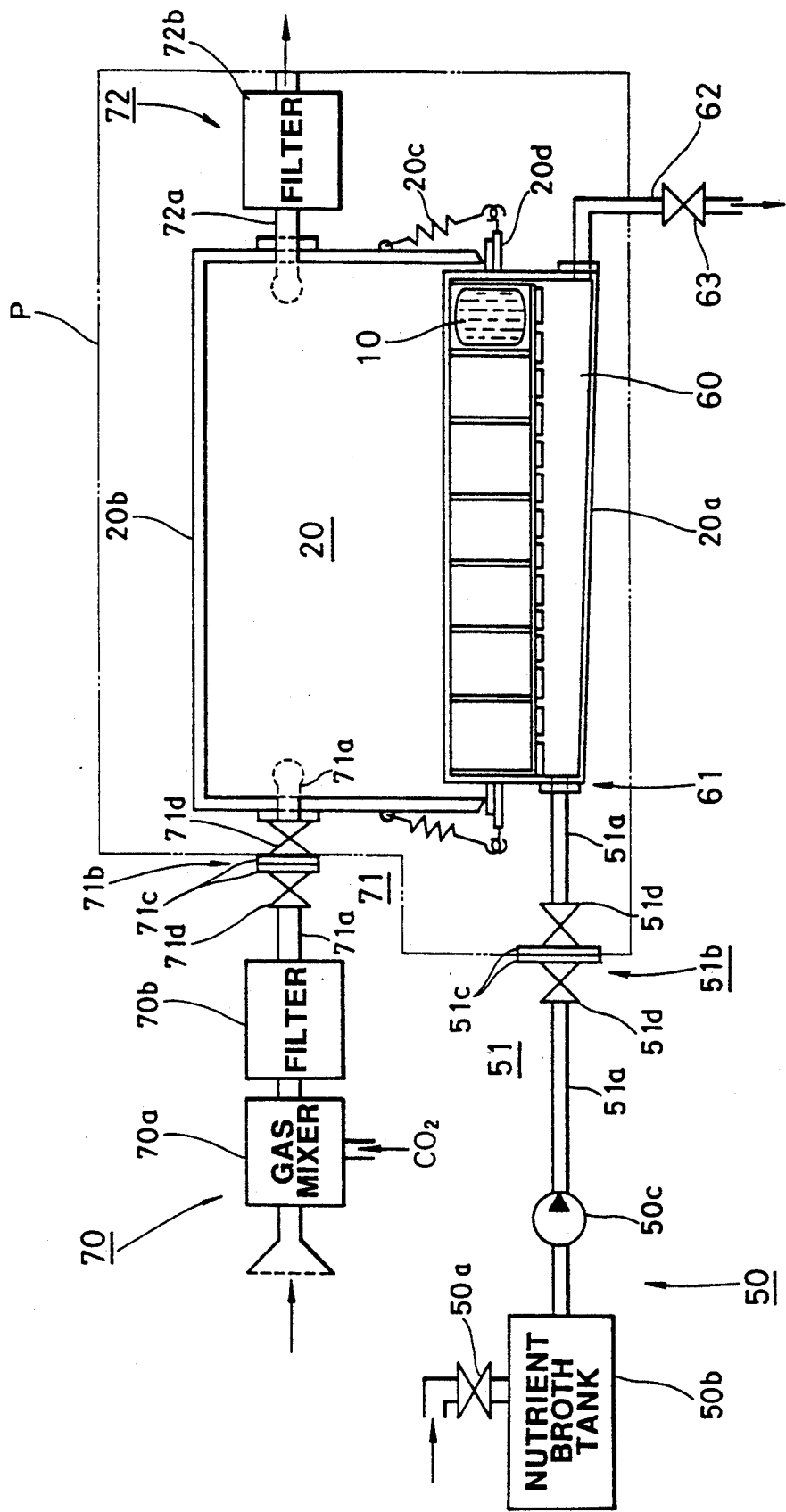
FIG. 9 is a schematic diagram illustrating an overall arrangement of a sixth embodiment of the liquid culture apparatus in accordance with the present invention.

FIG. 9 illustrates a sixth embodiment of the culture apparatus in accordance with the present invention. In this sixth embodiment, the structures of the liquid transfer device and the gas transfer device, in particular, of the apparatuses of the embodiments hitherto shown are embodied so that these devices can be detachably connected to the nursery chamber while maintaining an aseptic state. It should be noted that, in FIG. 9 as well, elements that are identical to those shown in the preceding drawings or functionally correspond thereto are shown by being denoted by identical or corresponding reference numerals.

In this sixth embodiment, the nursery chamber 20 for accommodating the nutrient broth supports 10 has its top portion constituted by a cover 20b having a hermetically closable structure and formed of light-transmitting plastics or glass. This cover 20b is arranged such that it is held in close contact with the main body 20a of the nursery chamber by means of springs 20c and receiving plates 20d of the main body 20a. The main body 20a of the nursery chamber is connected to the nutrient broth supplying device 50 via the liquid transfer device 51 having a nutrient broth joint 51b which can be sterilized, while the cover 20b is connected to the gas supplying device 70 via the gas transfer device 71 having a gas joint 71b which can be sterilized. These joints 51b, 71b are structured in such a manner that they can be hermetically closed even when they are not connected, as will be described later. In addition, the liquid impregnation/drainage controller 60 on which the nutrient broth supports 10 are mounted has its upper surface formed of a porous material such as a wire net, as has been described in connection with the first embodiment. The arrangement is such that the ratio between the amount of nutrient broth and the amount of gas in the nutrient broth supports 10 and so on can be adjusted by controlling the level of the nutrient broth supplied to the liquid impregnation/drainage controller 60. It should be noted that the type shown in the second to fourth embodiments may, of course, be used as the liquid impregnation/drainage controller, which further enhances the liquid replacing function thereof, as described before.

A description will now be given of the structures of the nutrient broth joint 51b and the gas joint 71b.

As illustrated, the nutrient broth joint 51b is a combination of a pair of flanges 51c, which are suitably connected together, and a pair of stop valves 51d disposed on opposite sides thereof. In addition, the gas joint 71b is similarly a combination of a pair of flanges 71c, which are suitably connected together, and a pair of stop valves 71d disposed on opposite sides thereof. Incidentally, reference numeral 51a denotes a main body of the liquid transfer device constituted by a pipe product or the like, while numeral 71a denotes a main body of the gas transfer device similarly constituted by a pipe product or the like. Thus, since the joints 51b, 71b are constructed as a combination of the flanges and the stop valves disposed on opposite sides thereof, after both the stop valves are closed, if the stop valves are separated from each other with the flanges serving as a boundary, it is possible to separate the nutrient broth supplying device 50 from the nursery chamber 20 (the main body 20a of the nursery chamber), and the gas supplying device 70 from the nursery chamber 20 (the cover 20b) in a state in which the shielded state of the nutrient broth supplying device 50, the gas supplying device 70, and the nursery chamber 20 is maintained. The nursery chamber 20 thus removed as a set by being separated from the nutrient broth supplying device 50 and the gas supplying device 70 can be separately subjected to sterilization treatment by such as being placed in an autoclave heat sterilizer. The section which can thus be removed as a set is shown as a section P in FIG. 9.

Accordingly, in the apparatus in accordance with this sixth embodiment, after the joints 51b, 71b are separated and the seedlings are taken out by removing the cover 20b from the main body 20a of the nursery chamber, the cover 20b, the main body 20a, the nutrient broth supports 10, and the like can be separately subjected to sterilization. In addition, after the plant body T (not shown) is implanted and accommodated, the plant body T can be hermetically sealed in the nursery chamber 20 in an aseptic state by means of the cover 20b.

When the nursery chamber 20 is connected to the nutrient broth supplying device 50 and the gas supplying device 70, the connection is effected via the respective joints 51b and 71b, as described above. At this juncture, since aseptic communication is established with these supplying devices, the interior of the communicating portions with these supplying devices are subjected to sterilization treatment by means of heating such as by being burnt with a heater. Incidentally, a bacteria-proof filter 70b for the gas is used on the gas-supplying side, and a tank which has been sterilized in advance is used as a nutrient broth tank 50b. In addition, with respect to the gas exhausting device 72 and the draining portion 62 as well, it is possible to adopt a similar structure, as required. In FIG. 9, reference numeral 50a denotes an inlet valve for the nutrient broth tank 50b; 50c, a pump; 63, the draining valve; 70a, a gas mixer; 72a, a main body of the gas exhausting device; and 72b, an exhaust filter. The waste liquid via the valve 63 may be disposed of, or may be allowed to communicated with the nutrient broth tank 50b so as to be returned thereto in an aseptic stage, as necessary.

Figure 10:
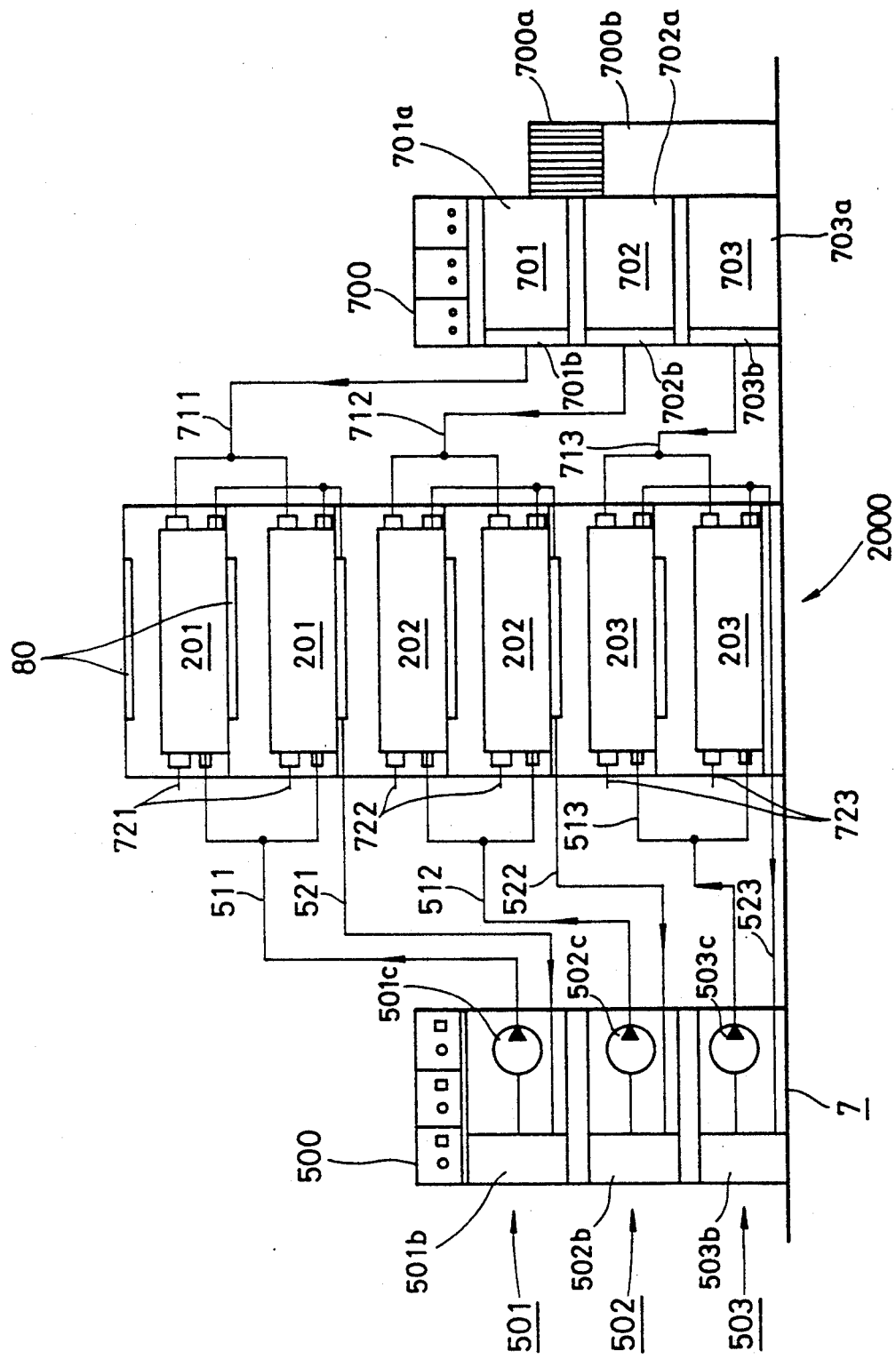
FIG. 10 is a schematic diagram illustrating an overall arrangement of a seventh embodiment of the liquid culture apparatus in accordance with the present invention.
Figure 11:
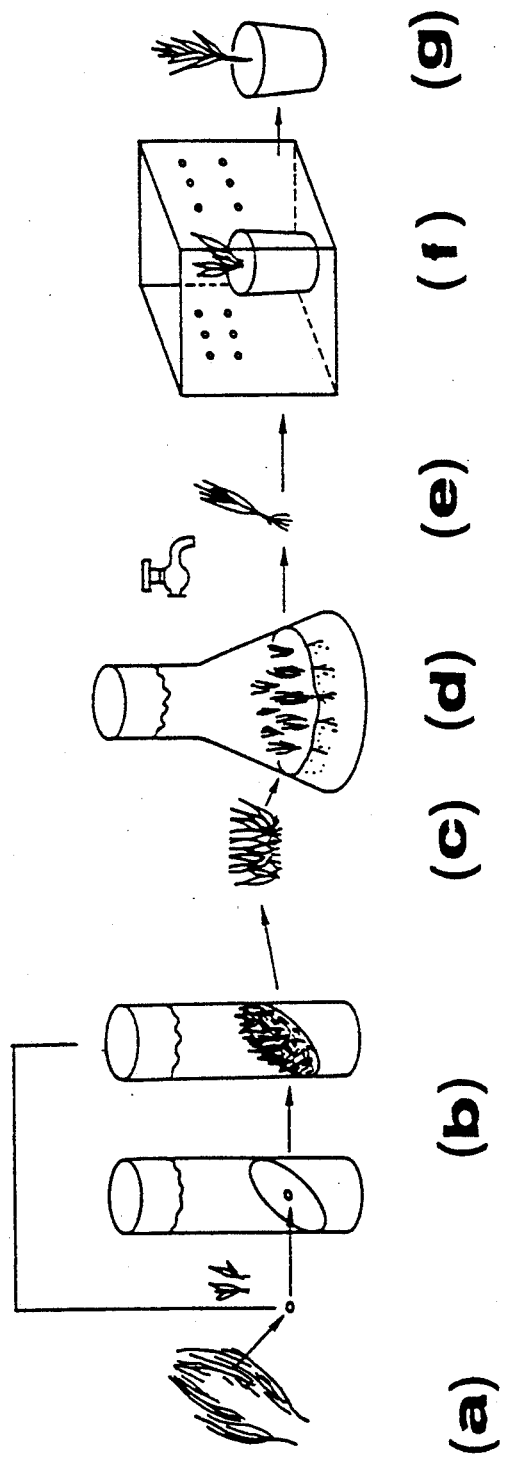
FIG. 11 is a schematic diagram diagrammatically illustrating the steps of processing of the conventional plant tissue culture using the agar medium.

FIG. 10 illustrates a seventh embodiment of the present invention. This seventh embodiment represents, in a way, a composite arrangement of the apparatuses of the embodiments shown in the above. In FIG. 10 as well, elements that are identical with those shown in the previous drawings or functionally correspond thereto as shown by being denoted by identical or corresponding reference numerals.

In this seventh embodiment, reference numeral 2000 denotes a culture rack assembly which is provided with a plurality of, i.e., six in the illustrative case, nursery chambers (two units each of the first to third nursery chambers 201-203). In this embodiment, optimum control of the nutrient broth and the gas is effected collectively in conformity with the stage of culture for each nursery chamber by means of the three nutrient broth supplying devices 501-503 and the gas supplying devices 701-703. Here, reference numeral 80 denotes the illuminator; 500, a controller for the nutrient broth supplying device; and 700, a controller for the gas supplying device.

In the implementation of the apparatus of this embodiment, the following diverse variations are conceivable, and they may be selected arbitrarily.

(1) The relationship of correspondence between the nursery chambers 201-203 and the supplying devices 501-503 and 701-703 is made arbitrarily changeable by adopting the joints shown in the sixth embodiment (FIG. 9) for the transfer devices 511-513 and 711-713 and the circulators 521-523.

(2) The transfer devices are used by being fixed between the supplying devices and the nursery chamber (regardless of whether or not the aforementioned joints are used).

(3) The first to third nutrient broth supplying devices 501-503 are also used exclusively in a corresponding manner with respect to the gas supplying devices 701-703 that are used exclusively for supplying the germination nutrient broth, the rooting nutrient broth, and the cultivation nutrient broth, respectively.

(4) In the first to third nutrient broth supplying devices 501-503, the supply of the germination nutrient broth, the supply of the rooting nutrient broth, and the supply of the cultivation nutrient broth are effected with the lapse of time in correspondence with the stage of culture, respectively, as described above.

In addition, in FIG. 10, an apparatus is shown which is of a circulation type in which the discharged nutrient broth is returned to nutrient broth tanks 501b-503b via the circulators 521-523, these circulators may be eliminated. In addition, in cases where the circulation type is adopted, it is possible to remove harmful components by using purifiers such as filters inside the circulators 521-523 or the tanks 501b-503b.

Thus, in accordance with the foregoing embodiments, without using an agar medium and by using porous or fibrous nutrient broth supports with good water retentivity and air permeability as well as the nutrient broth medium, it is possible to change the nutrient broth components into optimum components at each level of culture while constantly maintaining the overall apparatus in an aseptic state and without requiring any operation for transplanting.

It should be noted that, in the apparatuses of the first to seventh embodiments, a combination thereof is arbitrary, and the selection of the various elements in arranging the apparatus may be effected freely within the range in which the purport of the present invention is basically maintained. Favorable elements should be selected in the respective situations.

For instance, as the nursery chamber 20, there is a type which requires the implanting device and the illuminators such as those shown in FIGS. 1 and 8, and there is a type which is provided with a light-transmitting cover such as the one shown in FIGS. 4-6 and 9 and does not necessarily require the implanting device and the illuminators.

In addition, with respect to the liquid impregnation/drainage controller 60 (610-630) as well, the selection of its type is arbitrary. In particular, in cases where a plurality of nursery chambers such as those shown in FIGS. 8 and 10 are used, it is possible to adopt different types of liquid impregnation/drainage controller depending on the usage of culture of these nursery chambers. Incidentally, the liquid impregnation/drainage controllers 610-630 such as those shown in FIGS. 4-6 are favorable in cases where washing processing with pure water mentioned above is also carried out.

The nutrient broth supplying device 50 may be provided with an arrangement in which a plurality of tanks for separately storing the various nutrient broths and pure water are provided. Alternatively, an arrangement may be provided such that these various nutrient broths and pure water are changed over and stored in a single tank. These selections are also arbitrary.

In addition, there can be cases where the gas supplying device 70 is not necessarily required, depending on the environment where the nursery chamber is placed. That is, there are cases where a desired gas environment can be obtained simply by providing a ventilation hole or the like in the nursery chamber. In such a case, the gas supplying device 70 may be eliminated.

The same holds true of the control of the internal temperature and humidity of the nursery chamber. In addition, depending on the case, a temperature and humidity controller may be disposed separately in the nursery chamber.

INDUSTRIAL APPLICABILITY

In accordance with the present invention, the processing of a plant body, such as breeding, fostering of seedlings, and acclimatization to the outside can always be realized under an optimum environment in an aseptic state.

In addition, since no transplanting operation is required, substantial manpower can be dispensed with, and roots are not subject to damage, so that the time and cost involved in producing seedlings from the tissue of a plant body can be reduced, and consequently the high-speed, large-scale production and development of new plant varieties can be conducted efficiently.

In addition, the present invention is applicable to the culture of not only plant bodies but also adhesive animal cells, and has extensive usage.

We claim:

1. A liquid culture apparatus comprising:
    a nutrient broth support for supporting a plant body implanted therein and comprising a porous or fibrous material having a first porosity capable of absorbing a nutrient broth and bringing said broth into contact with said plant body;
    a nursery chamber for enclosing at least one said nutrient broth support in a controlled environment;
    first liquid controlling means for storing liquids such as various types of nutrient broths needed for various stages of plant growth such as germination and/or rooting broths and other liquids such as water and for supplying said liquids to said nursery chamber;
    second liquid controlling means comprising a liquid absorbant material having a second nursery which is smaller than said first porosity of said nutrient broth support, for supporting said nutrient broth support and receiving said liquid supplied to said nursery chamber by said first liquid controlling means and coupling said liquid to said nutrient broth support such that said nutrient broth support absorbs said liquid and brings said liquid into contact with said plant body, and, when said first liquid controlling means stops supplying said liquid, for receiving liquid which drains from said nutrient broth support;
    third liquid controlling means coupled to receive said drained liquid from said second liquid controlling means for draining said liquid through a path leading to a point outside said nursery chamber.

2. The apparatus of claim 1 wherein said liquid stored in said first liquid controlling means comprises a selected one of germination nutrient broth containing nutrient components effective for aiding in germination of said plant body implanted in said nutrient broth support, a rooting nutrient broth containing nutrient components effective for aiding the process of rooting by said plant body, a cultivation nutrient broth containing nutrient components effective for fostering growth of said plant body, said cultivation nutrient broth not containing sugar, or water for washing said plant body or roots thereof at predetermined times in the growth of said plant body, and wherein said first liquid controlling means includes means for selectively supplying appropriate ones of said liquids to said nutrient broth supports at appropriate times in the growth of said plant body.

3. The apparatus of claim 2 further comprising gas control means coupled to said nursery chamber for mixing air and carbon dioxide at a predetermined ratio and supplying the mixture to said nursery chamber as new gas, and for providing a path through which gas already in said nursery chamber pushed by said new gas may exit said nursery chamber.

4. The apparatus of claim 1 further comprising means coupled to said nursery chamber for providing an aseptic environment inside said nursery chamber surrounding said nutrient broth support.

5. The apparatus of claim 1 wherein said nursery chamber is divided into a plurality of chambers, each chamber corresponding to a stage in the growth of said plant body, and wherein said first, second and third liquid controlling means are coupled to each of said chambers.

6. The apparatus of claim 5 wherein said nursery chamber further comprises individual light source means for supplying light having a spectrum conducive to growth of said plant bodies for each of said chambers.

7. The apparatus of claim 6 wherein said light source means comprises individual light bulbs affixed to said nursery chamber in a position to shine light on said plant bodies.

8. The apparatus of claim 6 wherein said light source means comprises a light transmitting portion of said nursery chamber for passing natural light to said plant bodies.

9. The apparatus of claim 5, further comprising gas control means coupled to said nursery chamber for mixing air and carbon dioxide at a predetermined ratio and supplying the mixture to said nursery chamber as new gas, and for providing a path through which gas already in said nursery chamber pushed by said new gas may exit said nursery chamber.

10. The apparatus of claim 5 further comprising conveying means for conveying said nutrient broth support through said nursery chamber.

11. The apparatus of claim 1 further comprising implanting means coupled to said nursery chamber for automatically implanting said plant bodies into said nutrient broth support.

12. The apparatus of claim 1 further comprising gas supply means coupled to said nursery chamber for controlling the ratio of carbon dioxide and air inside said nursery chamber.

13. The apparatus of claim 1 wherein said nursery chamber further comprises means for supplying artificial light having a spectrum suitable for growth of said plant bodies.

14. The apparatus of claim 1 wherein said nursery chamber further comprises means for allowing artificial light to enter said chamber.

15. The apparatus of claim 1 wherein said second liquid controlling means include means to drain said liquid from said nutrient broth support when the level of liquid supplied to said nutrient broth support by said first liquid controlling means drops below a predetermined level.

16. The apparatus of claim 1 wherein said third liquid controlling means includes a vacuum pump for sucking liquid out of said nutrient broth support.

17. A liquid culture apparatus comprising:
a nutrient broth support for implantation of a plant body therein and constituted by a porous of fibrous material capable of being impregnated with a nutrient broth;
a nursery chamber for accommodating at least one said nutrient broth support;
first liquid controlling means for transferring and supplying a liquid to said nutrient broth support accommodated in said nursery chamber;
second liquid controlling means which is constituted by a water absorbant material having a smaller porosity than said nutrient broth support and is disposed at a bottom of said nursery chamber as a member for placing said nutrient broth support thereon, said second liquid controlling means being arranged such that when a level of the liquid supplied to said nutrient broth support has dropped below a predetermined level, said second liquid controlling means drains the liquid impregnating said nutrient broth support;
third liquid controlling means connected to said second liquid controlling means and adapted to discharge the liquid drained via said second liquid controlling means to outside said nursery chamber.

18. A liquid culture apparatus according to claim 17 wherein said third liquid controlling means has a vacuum pump for sucking and forcedly discharging the liquid drained via said second liquid controlling means.

* * * * *